US012559179B2

(12) United States Patent (10) Patent No.: US 12,559,179 B2

Carrie et al. (45) Date of Patent: Feb. 24, 2026

(54) MOTOR VEHICLE CROSS-MEMBER EXTENDING BETWEEN TWO SHOCK ABSORBER CUPS

(71) Applicants: RENAULT S.A.S, Boulogne Billancourt (FR); NISSAN MOTOR CO., LTD., Yokohama (JP)

(72) Inventors: Julien Carrie, Guyancourt cedex (FR); Luis De Almeida, Guyancourt cedex (FR); Edouard Girault, Guyancourt cedex (FR)

(73) Assignees: AMPERE S.A.S., Boulogne Billancourt (FR); NISSAN MOTOR CO., LTD., Yokohama (JP)

( * ) Notice: Subject to any disclaimer, the term of this patent is extended or adjusted under 35 U.S.C. 154(b) by 414 days.

(21) Appl. No.: 18/249,430

(22) PCT Filed: Sep. 28, 2021

(86) PCT No.: PCT/EP2021/076668
§ 371 (c)(1),
(2) Date: Apr. 18, 2023

(87) PCT Pub. No.: WO2022/089863
PCT Pub. Date: May 5, 2022

(65) Prior Publication Data
US 2023/0391406 A1 Dec. 7, 2023

(30) Foreign Application Priority Data
Oct. 28, 2020 (FR) ...................................... 20 11018

(51) Int. Cl.
B62D 25/08 (2006.01)
B62D 21/02 (2006.01)
(Continued)

(52) U.S. Cl.
CPC .......... *B62D 25/088* (2013.01); *B62D 21/02* (2013.01); *B62D 21/11* (2013.01); *B62D 27/065* (2013.01); *B62D 29/008* (2013.01)

(58) Field of Classification Search
CPC ...... B62D 21/02; B62D 21/11; B62D 25/081; B62D 25/088; B62D 27/065; B62D 29/008
See application file for complete search history.

(56) References Cited

U.S. PATENT DOCUMENTS 10,144,456 B1 12/2018 Ciccone et al.
2006/0027993 A1* 2/2006 Takayanagi .......... B62D 25/082
280/124.166
(Continued)

FOREIGN PATENT DOCUMENTS

DE 10 2006 041 099 A1 3/2008
DE 20 2018 104 149 U1 9/2018
(Continued)

OTHER PUBLICATIONS

International Search Report issued Jan. 18, 2022 in PCT/EP2021/076668 filed on Sep. 28, 2021, 2 pages.
(Continued)

*Primary Examiner* — Lori Lyjak
(74) *Attorney, Agent, or Firm* — Oblon, McClelland, Maier & Neustadt, L.L.P.

(57) ABSTRACT

A strut cross-member of a motor vehicle includes a central part and two side ends. Each of the ends includes an interface for attachment to the body of the vehicle and an interface for attachment to shock absorber cups. The cross-member is made of cast aluminum.

7 Claims, 3 Drawing Sheets

(51) Int. Cl.

| | | |
|---|---|---|
| *B62D 21/11* | (2006.01) | |
| *B62D 27/06* | (2006.01) | |
| *B62D 29/00* | (2006.01) | |

(56) References Cited

U.S. PATENT DOCUMENTS

| | | | | |
|---|---|---|---|---|
| 2007/0246971 | A1* | 10/2007 | Hanakawa | ........... B62D 25/081 296/203.01 |
| 2011/0316308 | A1 | 12/2011 | Matsuoka | |
| 2020/0070893 | A1 | 3/2020 | Atkin et al. | |

FOREIGN PATENT DOCUMENTS

| | | | | | |
|---|---|---|---|---|---|
| EP | | 2399807 | A1 * | 12/2011 | ........... B62D 25/081 |
| JP | | 2017-190102 | A | 10/2017 | |

OTHER PUBLICATIONS

Preliminary French Search Report issued Jul. 7, 2021 in French Patent Application No. 20 11018 filed on Oct. 28, 2020, 3 pages (with English Translation of Categories of Cited Documents).

* cited by examiner

Fig 1

MOTOR VEHICLE CROSS-MEMBER EXTENDING BETWEEN TWO SHOCK ABSORBER CUPS

BACKGROUND

The present invention relates to the field of motor vehicles and notably the transverse members or cross-members that extend transversely to the longitudinal axis of the motor vehicle.

More particularly, the present invention relates to motor vehicle front axle assemblies comprising a suspension member resting on a shock absorber cup.

In general, the shock absorber cup is secured to an axle comprising two side rails transversely connected by a cross-member.

It is also known practice to fit a cross-member on the vehicle-interior side, in the form of a tubular beam extending transversely in the driver's compartment of the motor vehicle. The driver's compartment cross-member allows the fixing of various driver's compartment elements such as the dashboard, the HVAC, heating, ventilation and air conditioning, system, the vehicle steering column, the glovebox, etc.

These cross-members are produced by hot or cold deformation of a tube. Obtaining them requires the use of a steel having high mechanical properties.

However, their structure does not allow separation of the flexural and torsional inertias and the method of manufacturing them is complex and requires numerous steps including pressing, heat treatment, clinching and peening.

In addition, the anti-roll stiffness offered by this type of cross-member is highly sensitive to the shape and the end restraints of the cross-member.

Cross-members comprising a plurality of sections welded together and fixed to the body of the vehicle via a fixing device secured to said cross-member at each of its ends are also known.

However, the welds between the tube sections give rise to a high risk of cracking at the welds.

There is a need to optimize motor vehicle cross-members capable of meeting stringent demands in terms of stiffness and shock-absorbing capability.

BRIEF SUMMARY

The objective of the invention is therefore to overcome the abovementioned disadvantages and to propose a motor vehicle cross-member, the shape of which is optimized with the aim of being more lightweight, more ergonomic and lower cost, while at the same time affording passenger safety in the event of a frontal impact.

One subject of the present invention is a motor vehicle strut tower brace cross-member comprising a central part and two lateral ends, each of said ends comprising an interface for fixing to the body of the vehicle and an interface for fixing to shock absorber mounts or cups, said cross-member being made of cast aluminum. The strut tower brace cross-member thus extends transversely between two shock absorber cups.

Thus, the strut tower brace cross-member is able to ensure the dynamic handling stiffness of the shock absorber cups.

Advantageously, the cross-member is a one-piece component.

For example, the interfaces for fixing to the body of the vehicle comprise at least one orifice for the passage of a screw-fastening element and the interfaces for fixing to the shock absorber cups comprise at least one orifice for the passage of a screw-fastening element. As a variant, a number of orifices greater than or equal to two could be provided.

According to one embodiment, the cross-member comprises at least one fixing lug projecting from the central part in the direction away from the vehicle interior and forming a mounting interface for a charging device for a battery of a propulsion unit.

The strut tower brace cross-member thus also has the function of guaranteeing the dynamic stiffness of the charging device.

According to one embodiment, the cross-member comprises two pairs of fixing lugs for the charging device, each pair of fixing lugs comprising a recess formed by an absence of material collaborating with a support mounting of corresponding shape secured to the charging device.

According to one embodiment, the cross-member comprises at least one fixing lug projecting from the central part and forming a mounting interface for mounting a heating unit of the HVAC type.

The fixing lugs for the charging device and for the heating unit may be the same lugs or separate lugs.

For example, the central part comprises a plurality of projecting parts projecting towards the vehicle interior.

Such projecting parts are cut out in such a way as to suit the shape of other components of the motor vehicle.

As a variant, provision could be made for the rear face to have other cut-out shapes in order to suit all types of motor vehicle.

Each of the ends may comprise a fixing interface for fixing a water tank and/or fixing interface for fixing a wiper mechanism.

The underside face of the central part of the cross-member may comprise a plurality of stiffening ribs.

A second aspect of the invention relates to a front axle assembly for a motor vehicle comprising an engine compartment delimited by two longitudinal arms, at least a first transverse cross-member connecting said arms, and a body of the vehicle, the front axle assembly comprising two suspension members, such as suspension springs or shock absorbers, each connected to a front wheel of the vehicle via one of their ends and to a support mounting or supporting cup by the other of their ends, characterized in that it comprises a strut tower brace cross-member as described hereinabove extending transversely in the engine compartment transversely between the shock absorber cups.

Thus, the strut tower brace cross-member makes it possible to ensure the dynamic handling stiffness of the shock absorber cups.

Another aspect of the invention relates to a motor vehicle comprising a front axle assembly as described hereinabove.

BRIEF DESCRIPTION OF THE DRAWINGS

Further objects, features and advantages of the invention will become apparent from reading the following description, given solely by way of nonlimiting example, and given with reference to the attached figures in which:

Figure 1:
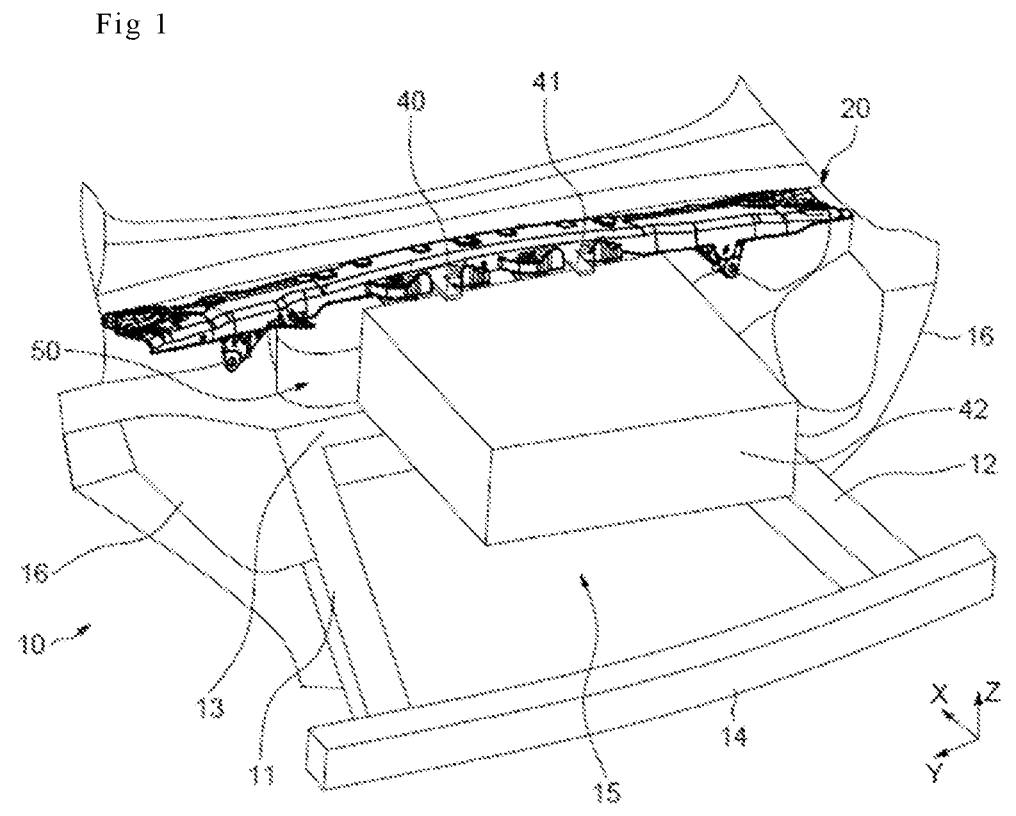

FIG. 1 is a schematic perspective view of part of a front axle assembly of a motor vehicle comprising a cross-member according to one embodiment of the invention;

Figure 2:
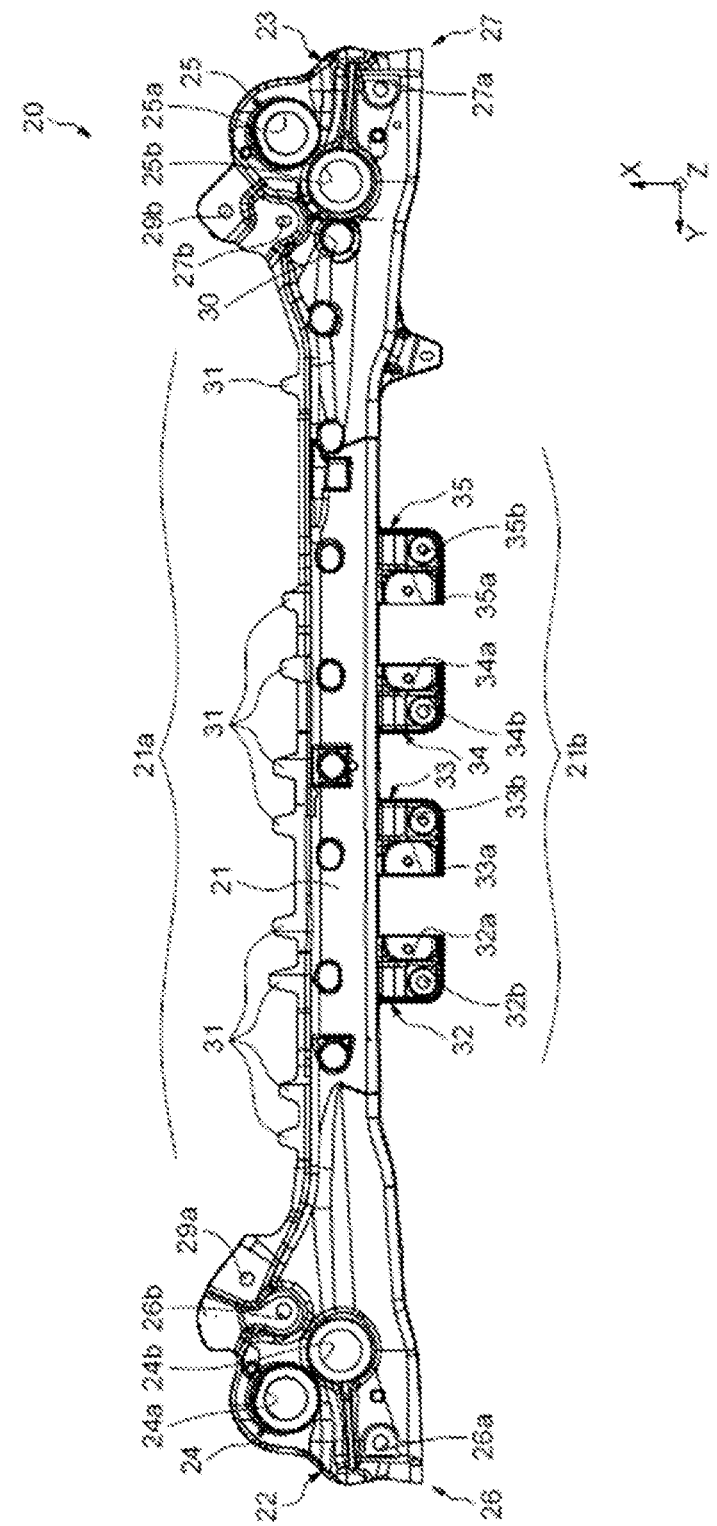
FIG. 2 is a view from beneath of the cross-member of FIG. 1.

In the description that follows, the terms "longitudinal", "transverse", "vertical", "front", "rear", "left" and "right"

are defined in accordance with the usual orthogonal frame of reference for motor vehicles, depicted in the drawings, and which comprises:

a longitudinal axis X which is horizontal and directed from the front of the vehicle toward the rear;

a transverse axis Y which is horizontal, perpendicular to the longitudinal axis X and oriented from the left of the vehicle toward the right when the vehicle is moving forward;

a vertical axis Z, which is orthogonal to the longitudinal and transverse axes X and Y.

DETAILED DESCRIPTION

FIG. 1 depicts part of a motor vehicle front axle assembly 10 comprising an axle comprising two longitudinal arms 11, 12 connected by a first transverse cross-member 13 and which, together with a front bumper cross-member 14 and the body 16 of the vehicle, delimit the engine compartment 15. The arms 11 connect the body of the vehicle (not depicted) to support mountings for wheels (not depicted).

The engine compartment 15 is separated from the (unreferenced) motor vehicle interior by a wall 16 or bulkhead extending in the YZ plane.

What is meant by a "transverse" direction is a direction perpendicular to the longitudinal direction X of the vehicle.

The front axle assembly part 10 further comprises two suspension members, such as suspension springs or shock absorbers (not depicted) which are each connected to a front wheel of the vehicle via one of their ends and to a support mounting or supporting cup (not depicted) by the other of their ends.

The front axle assembly part 10 comprises a strut tower brace cross-member 20 extending in the engine compartment 15 transversely between the shock absorber cups.

The strut tower brace cross-member 20 is made of cast aluminum. The strut tower brace cross-member 20 takes the form of a plate with a vertical dimension smaller than the longitudinal dimension.

Specifically, this is because the current designs of engine compartments for electrically powered vehicles do not allow for the integration of a tubular cross-member between the two shock absorber cups.

The strut tower brace cross-member 20 comprises a central part 21 and two lateral ends 22, 23.

The strut tower brace cross-member 20 is fixed, by screw-fastening elements, at its two ends 22, 23, to the body of the vehicle and to a respective shock absorber cup. Said cross-member thus ensures the dynamic handling stiffness of the shock absorber cups.

Each of the ends 22, 23 has a fixing interface 24, 25 for fixing to the body of the vehicle and a fixing interface 26, 27 for fixing to the shock absorber cups.

As illustrated, the fixing interfaces 24, 25 for fixing to the vehicle body comprise two orifices 24a, 24b and 25a, 25b for the passage of a screw-fastening element. As an alternative, a number of orifices different than two per end, for example greater than or equal to three, could be provided.

As illustrated, the fixing interfaces 26, 27 for fixing to the shock absorber cups comprise two orifices 26a, 26b and 27a, 27b for the passage of a screw-fastening element. As an alternative, a number of orifices different than two per end, for example greater than or equal to three, could be provided.

Entirely nonlimitingly, each of the ends 22, 23 comprises a fixing interface 29a, 29b for fixing a water tank (not depicted) and a fixing interface 30 for fixing a wiper mechanism (not depicted).

The central part 21 of the strut tower brace cross-member 20 is delimited by a rear face 21a facing toward the vehicle interior and a front face 21b on the opposite side to the rear face 21a, facing away from the vehicle interior.

As illustrated, the rear face 21a comprises a plurality of projecting parts 31 projecting toward the vehicle interior and mutually spaced apart. Said projecting parts 31 are intended to collaborate with the bulkhead of the motor vehicle.

Such projecting parts are cut out in such a way as to suit the shape of other components of the motor vehicle.

As an alternative, provision could be made for the rear face 21a to have other cut-out shapes so as to suit all types of motor vehicle.

As illustrated, the front face 21a of the cross-member 20 comprises fixing lugs 32, 33, 34, 35, in this instance four of them.

The fixing lugs project from the front face 21a. These fixing lugs may project in the direction away from the vehicle interior. In an embodiment variant which has not been illustrated, said fixing lugs may project in the opposite direction.

Each pair of fixing lugs 32, 33; 34, 35 comprises a recess formed by an absence of material 32a, 33a; 34a, 35a intended to accept a support mounting 40, 41 of corresponding shape, secured to a charging device 42 for the battery of the propulsion unit.

The strut tower brace cross-member 20 thus also has the function of ensuring the dynamic stiffness of the charging device 42.

The support mountings 40, 41 for the charging device 42 are configured to break in the event of a frontal impact to the motor vehicle and thus to direct the charging device in a vertical rather than longitudinal direction.

Each of the fixing lugs 32, 33; 34, 35 comprises a fixing interface 32b, 33b; 34b, 35b for fixing to a heating unit 50 of HVAC type.

As an alternative, provision could be made for one of the pairs of fixing lugs to comprise a fixing interface for fixing to the heating unit 50.

Thus, the heating unit 50 is sited in the engine compartment 15 rather than in the vehicle interior as is the case in known motor vehicles.

Figure 3:
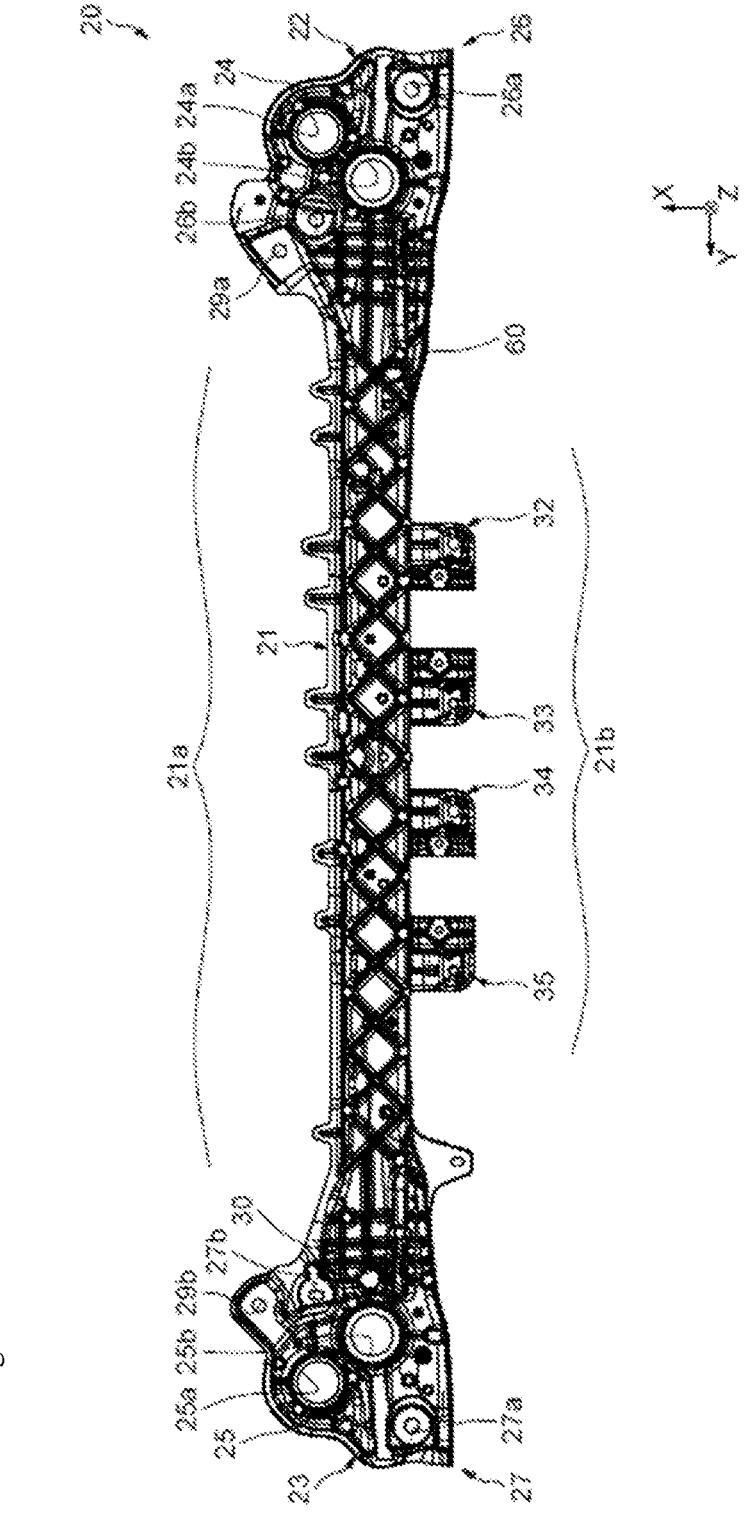
FIG. 3 is a view from above of the cross-member of FIG. 1.

As illustrated in detail in FIG. 3, the strut tower brace cross-member 20 comprises a plurality of stiffening ribs 60 notably provided in the central part 21 of the cross-member.

The ribs 60 here have closed contours.

As a variant, other forms of stiffening rib 60 could be provided.

As illustrated, the strut tower brace cross-member 20 is not symmetrical about the longitudinal axis X.

The strut tower brace cross-member 20 is a substantially flat and not extruded one-piece component.

The strut tower brace cross-member 20 is advantageously produced by casting aluminum in a mold followed by recutting in order to be able to suit a large number of motor vehicles.

Thus, using one single mold, it is possible to create a strut tower brace cross-member that is modular so that it can suit a number of vehicles.

The strut tower brace cross-member 20 is able to support a plurality of mechanical components of the motor vehicle such as, in particular, although not exclusively, the shock absorber cups, the charging device and the heating unit, and do so while all the while maintaining the dynamic stiffness of the elements and reducing the costs of manufacture of the cross-member.

The invention claimed is:

1. A front axle assembly for a motor vehicle comprising an engine compartment delimited by two longitudinal arms, at least a first transverse cross-member connecting said arms, and a body of the vehicle, the front axle assembly comprising:

two suspension members each connected to a front wheel of the vehicle via a first end of the suspension member and to a shock absorber cup by a second end of the suspension member;

a one-piece strut tower brace cross-member made of cast aluminum, the cross-member extending transversely in the engine compartment between the shock absorber cups, the cross-member comprising a central part and two lateral ends, each of the ends comprising an interface to be fixed to the body of the vehicle and an interface to be fixed to the shock absorber cups; and a battery comprising a charging device, wherein the cross-member comprises at least one fixing lug that projects away from the central part in a direction away from an interior of the vehicle, the at least one lug forms a support of the charging device of the battery.

2. The front axle assembly as claimed in claim 1, wherein the interfaces to be fixed to the body of the vehicle comprise at least one orifice for passage of a screw-fastening element and the interfaces to be fixed to the shock absorber cups comprise at least one orifice for passage of a screw-fastening element.

3. The front axle assembly as claimed in claim 1, wherein the at least one lug comprises two pairs of fixing lugs for the charging device, each pair of fixing lugs comprising a recess formed by an absence of material collaborating with a support mounting of corresponding shape secured to the charging device.

4. The front axle assembly as claimed in claim 1, further comprising a heating unit arranged in the engine compartment, wherein the cross-member comprises at least one fixing lug projecting from the central part and forming a mounting interface to be mounted to the heating unit.

5. The front axle assembly as claimed in claim 1, wherein the central part comprises a plurality of projecting parts projecting towards the interior of the vehicle and configured to cooperate with a bulkhead of the vehicle.

6. The front axle assembly as claimed in claim 1, wherein each of the ends comprises a fixing interface to be fixed to a water tank and/or a fixing interface to be fixed to a wiper mechanism.

7. A motor vehicle comprising:

the front axle assembly as claimed in claim 1.

* * * * *